W. R. TEMPLETON.
STEAM TRAP.
APPLICATION FILED AUG. 3, 1917.

1,341,027.

Patented May 25, 1920.
2 SHEETS—SHEET 1.

Inventor.
William R. Templeton
by Heard Smith & Tennant.
Atty's.

W. R. TEMPLETON.
STEAM TRAP.
APPLICATION FILED AUG. 3, 1917.

1,341,027.

Patented May 25, 1920.
2 SHEETS—SHEET 2.

Inventor.
William R. Templeton
by Heard Smith & Tennant.
Atty's.

UNITED STATES PATENT OFFICE.

WILLIAM R. TEMPLETON, OF BOSTON, MASSACHUSETTS, ASSIGNOR TO TEMPLETON MANUFACTURING COMPANY, OF BOSTON, MASSACHUSETTS, A CORPORATION OF MASSACHUSETTS.

STEAM-TRAP.

1,341,027.   Specification of Letters Patent.   Patented May 25, 1920.

Application filed August 3, 1917. Serial No. 184,339.

*To all whom it may concern:*

Be it known that I, WILLIAM R. TEMPLETON, a citizen of the United States, residing at Boston, county of Suffolk, State of Massachusetts, have invented an Improvement in Steam-Traps, of which the following description, in connection with the accompanying drawing, is a specification, like characters on the drawing representing like parts.

This invention relates to steam traps, such as are used for delivering feed water to a boiler, and the object of the invention is to provide a novel steam trap which is adapted to return to the boiler either water of condensation from a steam-heating system, or deliver to the boiler water directly from the city main or other outside source of supply, or to deliver to the boiler both the water of condensation and water from an outside supply.

In order to give an understanding of my invention, I have illustrated in the drawings a selected embodiment thereof which will now be described, after which the novel features will be pointed out in the appended claims.

In the drawings, Figure 1 is a side view of a steam trap embodying my invention;

Figure 1:
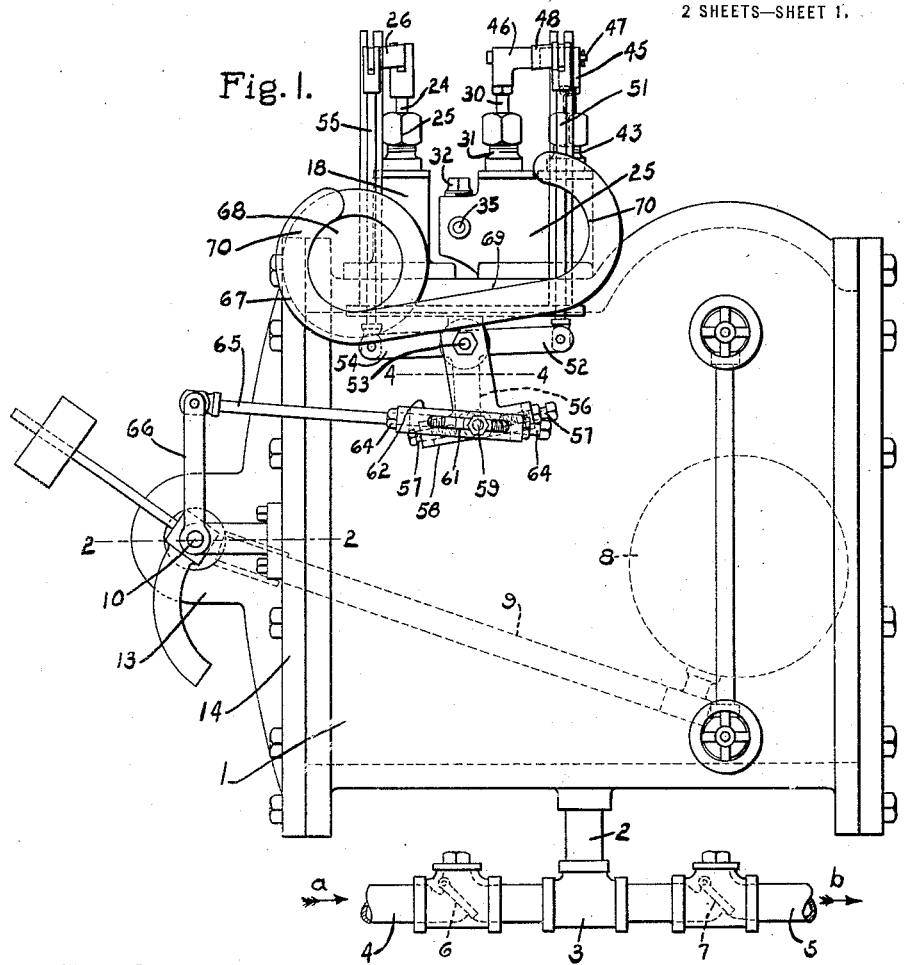
Figure 2:
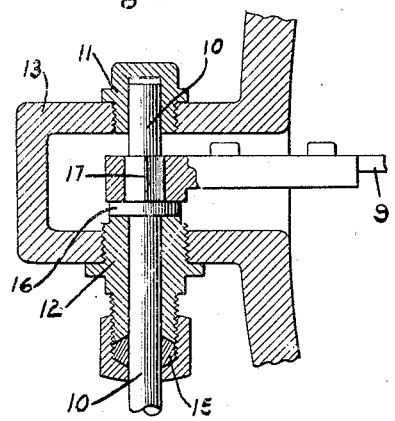
Fig. 2 is an enlarged section on the line 2—2, Fig. 1.

1 indicates a casing or chamber having a pipe 2 leading into its bottom, which pipe is connected by the T 3 with two branch pipes 4 and 5. The pipe leads to the return of the heating system with which the trap is used, and it has a check-valve 6 therein which allows the water of condensation to flow through the pipe 4 in the direction of the arrow *a*, but prevents return movement. The pipe 5 leads to the boiler or to a reservoir from which the boiler is filled, depending upon the location of the trap.

It is necessary that the casing 1 should be situated below the level of the lowest radiator in the heating system so that the water of condensation may flow from all the radiators into the casing 1. If the boiler is situated below all of the radiators in the steam-heating system so that the trap 1 is above the boiler, then the pipe 5 may lead directly into the boiler, but if some of the radiators, and consequently the trap 1, are below the water level in the boiler, then the pipe 5 will preferably feed to a tank above the boiler which is connected thereto. In either case the pipe 5 has a check-valve 7 therein which will allow water to flow from the trap 1 through the pipe 5 in the direction of the arrow *b*, but will prevent water from flowing back through the pipe 5 into the trap 1.

Situated within the trap 1 is a float 8 which is sustained by a float-arm 9 that is fast on a rock-shaft 10. This rock-shaft is journaled in two bearing members 11 and 12 carried by an extension 13 of the casing 1, said extension being formed on the head 14 of the casing. The bearing member 11 is a cup-shaped member screwed into one side of the extension 13 and in which one end of the rock-shaft 10 is received. The bearing 12 is in the form of a gland through which the rock-shaft 10 extends, said gland having a stuffing-box 15 thereon to make a tight joint. Said shaft 10 is provided with a collar 16 which bears against and seats on the inner end of the gland 12, said collar making with the gland a tight joint.

The float-arm 9 may be made fast to the shaft in any suitable way. I have herein shown the rock-shaft as provided with the squared portion 17 on which the arm 9 is sustained.

The trap or casing 1 is connected to the boiler through a normally-closed valve connection, and valve-actuating means controlled by the float 8 is employed for opening the steam valve when the casing 1 is filled, thereby admitting the steam pressure of the boiler to the casing. When the steam valve is closed, the water of condensation will flow through the pipe 4 and connection 2 into the trap 1, thus gradually filling it, and as it fills, the float 8 will rise. When the float reaches a predetermined position, the steam valve is opened, thus admitting the steam pressure of the boiler to the casing, and this steam pressure will operate to force the water from the casing 1 through the pipe 5 into either the boiler or into the tank situated above the boiler. As the water is delivered from the casing 1, the float descends, and when it reaches its lower limit, the steam valve is again closed, thus permitting the casing to be again filled with water.

Figure 5:
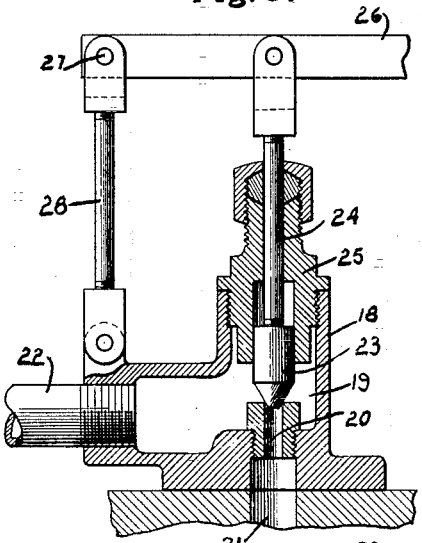
Fig. 5 is a sectional view showing the steam inlet valve.

The steam valve is indicated generally at 18 and is shown in section in Fig. 5. It comprises a casing having a valve chamber 19 which communicates through a port 20 with a duct or opening 21 leading into the casing 1. 22 is a steam pipe leading into the valve chamber 19, said pipe leading to the boiler. The port 20 is controlled by a valve 23 which is connected to a stem 24 that extends through the stuffing-box 25 and is pivotally connected to an actuating lever 26, said lever being pivoted at 27 to a post 28 that rises from the valve casing 18. When the valve 23 is raised, then steam may be admitted to the trap 1, as above described.

Coöperating with the steam valve 18 is a water valve and an air valve, the air valve being for the purpose of allowing the escape of any air which may become trapped in the casing 1 as it fills with water, and the water-valve being for the purpose of admitting to the casing 1 water from the city mains or some other outside source.

Figure 6:
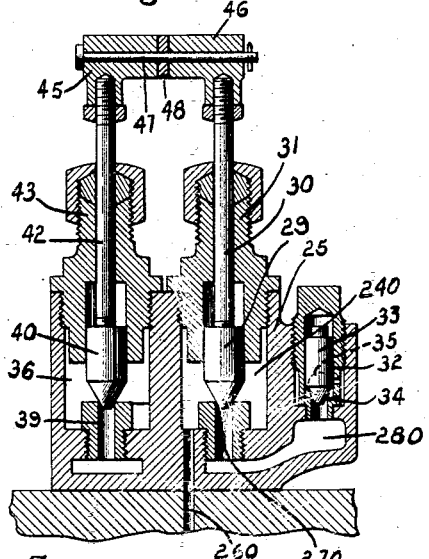
Fig. 6 is a sectional view showing the air valve and the water inlet valve.
Figure 7:
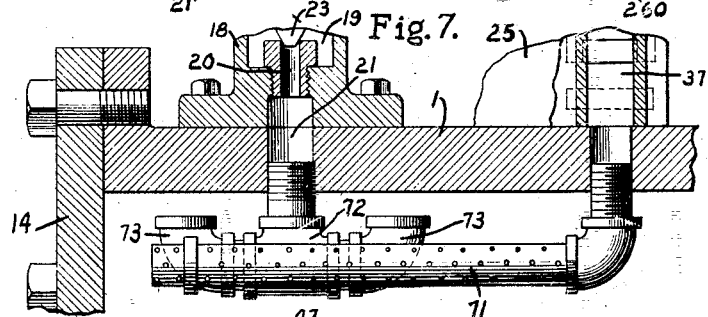
Fig. 7 is a detail sectional view showing the connections between the steam valve, water valve and the casing.
Figure 8:
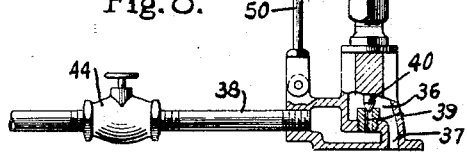
Fig. 8 is a view of the water inlet valve.

Both the air valve and the water valve are shown as incorporated in the valve casing 25 which is secured to the top of the tank 1. The air valve comprises a valve chamber 240 which communicates with the interior of the casing 1 through a port or duct 260 and which also communicates through the valved port 270 with the chamber 280. The port 270 is controlled by a positively-operated air valve 29 that is secured to a stem 30 extending through the stuffing-box 31. The chamber 280 communicates with the atmosphere through a relief valve herein shown as comprising a housing 32 which incloses a weighted valve 33 that normally rests on a valve-seat 34. When the valve 33 is raised, then the chamber 280 is in direct communication with an outlet port 35 shown in dotted lines in Fig. 6. The valve 33 is in the nature of a weighted check-valve.

The water-valve which is associated with the air-valve comprises a valve chamber 36 which communicates with the interior of the casing 1 through a duct 37 and which also has communication with a water-inlet pipe 38 through the port 39. The port is controlled by a valve 40 secured to a stem 42 that extends through a stuffing-box 43. The pipe 38 is provided with a valve 34 which controls the supply of water.

The valves are actuated by a suitable float-controlled valve-actuating mechanism so constructed that when the steam-valve 23 is opened, the water valve 40 and air valve 29 are closed, while when the steam-valve 23 is closed, the other valves will be opened. This valve-actuating mechanism is also so constructed that when the float is in its lowest position, as shown in Fig. 1, the steam-valve is closed and the water-valve and air-valve are opened, while when the float has been raised to the top of the casing 1, the steam valve will be opened and the water-valve and air-valve will be closed. When the parts are in the position shown in Fig. 1 with the steam-valve closed and the water-valve and air-valve opened, the water of condensation will flow from the return pipe 4 into the casing 1, thus gradually filling the latter. When the casing is filled, the raised float actuates the valve-controlling mechanism so as to open the steam-valve and close the water and air-valves, and the steam pressure which is thus admitted to the casing will force the water therefrom through the pipe 5. The valve-actuating mechanism is constructed so that it will be inactive until the float reaches either its highest or its lowest point, and then will become active for giving the valve a quick movement.

The valve stems 42 and 30 of the water and air-valves are connected at their upper ends to heads 45 and 46 which in turn are connected by the pin 47 to a lever 48. This lever is pivotally connected at one end, as shown at 49, to a post 50, and the other end of the lever is connected by a link 51 to one arm 52 of a T-shaped lever that is pivoted to the casing 1 at 53. Another arm 54 of this T-shaped lever is connected by the link 55 to the end of the lever 26 and hence as the lever 54, 52 rocks about its pivot 53, the valves will be opened and closed, as above set forth. The third arm 56 of this three-armed lever is situated between two adjustable screws 57 carried by a rocker member 58 which is also pivoted on the stud or pivot 53. The screws 57 are adjusted so that there is some lost motion between them and the arm 56. The rocker 58 has a stud 59 extending therefrom on which is mounted a sleeve 60, the outer end of the stud extending loosely through a slot 61 in a head 62. This head 62 is provided with two arms 63 in which are mounted stop screws 64 that are adapted to have engagement with the sleeve 60, the stop-screws being adjusted so that the space between them is somewhat greater than the diameter of the sleeve 60. The head 62 is secured to the end of a link 65 which is pivoted to an arm 66 fast on the rock-shaft 10.

Figure 3:
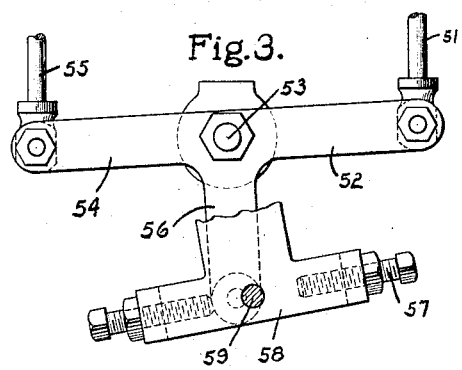
Fig. 3 is a view of a portion of the valve-actuating mechanism.
Figure 4:
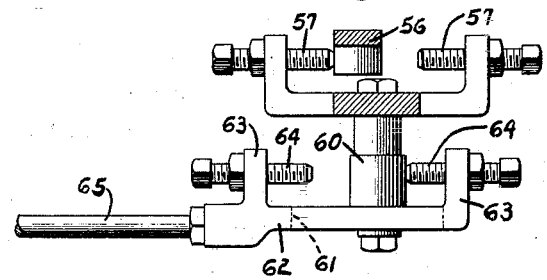
Fig. 4 is an enlarged sectional view on the line 4—4, Fig. 1.

The rocker 58 has rigid therewith a cradle 67 in which a weight member 68 is mounted to roll, said cradle presenting a track 69 on which the weight 68 rolls and having upwardly-directed curved arms 70 at its ends which limit the rolling movement of the weight 68. The parts are shown in Figs. 1, 3 and 4 in the position they occupy when the casing 1 is empty, and when in this position the three-armed lever is so placed that the steam-valve 23 is closed while the water-valve 40 and air-valve 29 are opened.

If, however, the valve 44 in the water connection 38 is closed, no water from the city main or other outside source can be admitted to the trap. In actual practice, I propose to have the valve 44 just cracked open so that a very small amount of water can flow therethrough.

The water of condensation will thus enter the casing 1 through the pipe 4 and the float 8 will gradually rise. This rising movement of the float will turn the rock-shaft 10 and move the link 65 to the left, Figs. 1 and 4. This movement of the link acts through the right-hand screw 64 and sleeve 60 to turn the rocker 58. In the position shown in Fig. 1, the rocker is so situated that the left-hand end of the cradle is lowest and the weight 68 is thus at said left-hand end. As the lever is turned by the rising float, the cradle will be moved first into a horizontal position and then will be turned so that the right-hand end thereof will be lowest. When the cradle reaches this position the weight 68 will move toward the lower right-hand end of the cradle, the rolling weight giving an added impulse to the cradle and quickly moving it into its final position.

During the initial turning movement of the rocker 58, the right-hand set-screw 57 will be carried toward the arm 56 of the three-armed lever, and said set-screws are so adjusted that said right-hand set-screw will come into contact with the three-armed lever just about the time that the cradle has been turned into position to cause the weight 68 to roll to the right-hand end. Hence, the final movement of the cradle which is due to the rolling movement of the weight 68 will act through the right-hand screw 57 to turn the three-armed lever and thus raise the arm 54 and lower the arm 52. This opens the steam-valve 23 and closes the water-valve 40 and air-valve 29. During this final quick weight-actuated movement of the rocker the stud 59 and its sleeve 60 will be carried away from the right-hand screw 64 and into contact with the left-hand screw 64 in Fig. 4, the lost motion between said sleeve and said stop screw being to permit this quick movement of the rocker.

As soon as the valves have been shifted, the steam pressure which is admitted to the tank 1 will force the water therefrom through the pipe 5, and the lowering movement of the float will act through the left-hand screw 64 to move the rocker in a reverse direction. As soon as the rocker passes its central position, which will be when the float has reached substantially the position shown in Fig. 1, then the weight 61 will move toward the left-hand end of the cradle and will operate to quickly close the steam-valve and open the air and water valves, thus restoring the parts to the position shown in Figs. 1 and 4. When the casing has been emptied of water, it is, of course, filled with steam. As soon as the steam-valve is closed and the water-valve is opened, the cold water which is admitted through the water valve will immediately condense the steam, thus removing any pressure in the casing 1, and, under some circumstances, actually creating a vacuum therein so that the water of condensation will freely flow into the casing from the pipe 4.

The valve 44 may be adjusted so that the continual addition of water to the casing will be just sufficient to make good any loss which may occur from steam leaking at radiators or other connections and thus maintain a proper amount of water in the boiler at all times.

In order to make the water more effective in condensing the steam, I propose to connect the port 37 with a spray pipe 71 so that the water will be discharged into the casing 1 in the form of a spray. The steam inlet port 21 is connected to a T 72 located within the casing 1 and having the upwardly-directed arm 73 so that the steam is delivered into the casing in two streams which are directed against the top of the casing. This prevents any boiling or agitation of the water such as would be due to the steam being delivered directly thereinto.

I claim:

1. In a steam trap, the combination with a casing having an opening in its bottom through which water from a heating system may enter the casing and through which the water in the casing may be discharged, said casing having at its top a steam inlet, a water inlet, and an air vent outlet, a steam valve for the steam inlet, a water valve for the water inlet, and an air valve for the vent, a float in the casing, and connections between said float and said valves whereby when the float is raised the steam valve is opened and the water and air valves are closed, while when the float is lowered, the steam valve is closed and the water and air valves are opened.

2. In a steam trap, the combination with a casing having an opening in its bottom through which water from a heating system may enter the casing and through which the water in the casing may be discharged, said casing having at its top a steam inlet and an air vent outlet, of a steam valve for the steam inlet, an air valve for the vent outlet, a pivoted T-shaped lever connected to said valves to cause them to operate simultaneously but oppositely, a rocking member pivoted co-axially with said lever and having a depending portion carrying two screws between which one arm of the T-shaped lever is received, a cradle associated with the rocking member, a rolling weight carried by the cradle, a stud extending from the rocking member below its pivotal point, a member having a slot in which said stud is received, a float in the casing, a rock shaft to which the float is attached, and connections between the rock shaft and the slotted member.

3. In a steam trap, the combination with a casing having a steam inlet and a separate air vent outlet, of a valve for the steam inlet, another valve for the air vent outlet, a pivotally-mounted lever connected to said valves to cause them to operate simultaneously but oppositely, a cradle pivoted co-axially with said lever, a rolling weight on said cradle, a connection having lost motion between the cradle and the lever, a float in the casing, a pivotally-mounted float arm to which the float is connected, said cradle having a depending centrally-situated arm, and a connection having lost motion between said float arm and said depending arm of the cradle.

In testimony whereof, I have signed my name to this specification.

WILLIAM R. TEMPLETON.